(12) United States Patent
Yamada

(10) Patent No.: US 8,848,243 B2
(45) Date of Patent: Sep. 30, 2014

(54) IMAGE PROCESSING APPARATUS, CONTROLLING METHOD OF IMAGE PROCESSING APPARATUS, AND STORAGE MEDIUM

(71) Applicant: Canon Kabushiki Kaisha, Tokyo (JP)

(72) Inventor: Naoto Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 13/660,480

(22) Filed: Oct. 25, 2012

(65) Prior Publication Data

US 2013/0135632 A1 May 30, 2013

(30) Foreign Application Priority Data

Nov. 29, 2011 (JP) .................................. 2011-260780

(51) Int. Cl.
*H04N 1/60* (2006.01)
*G06K 15/00* (2006.01)

(52) U.S. Cl.
USPC ........................................... 358/1.9; 358/2.1

(58) Field of Classification Search
USPC .................................. 358/1.9, 1.13, 2.1, 1.16
See application file for complete search history.

(56) References Cited

U.S. PATENT DOCUMENTS

2005/0168764 A1* 8/2005 Yamamura ................... 358/1.13

FOREIGN PATENT DOCUMENTS

JP 2002-240361 8/2002

* cited by examiner

*Primary Examiner* — Charlotte M Baker
(74) *Attorney, Agent, or Firm* — Fitzpatrick, Cella, Harper & Scinto

(57) ABSTRACT

A plurality of preview images in case of color printing performed to an area selected by a user and monochrome printing performed to an area not selected by the user are generated based on a plurality of parameters, and then the generated preview images are displayed. Further, preview images in case of color printing performed to a specific area and monochrome printing performed to another area are generated respectively to a plurality of patterns, and then the generated preview images are displayed.

7 Claims, 11 Drawing Sheets

IMAGE PROCESSING APPARATUS, CONTROLLING METHOD OF IMAGE PROCESSING APPARATUS, AND STORAGE MEDIUM

BACKGROUND OF THE INVENTION

1. Field of the Invention

The present invention relates to an image processing apparatus, a controlling method of the image processing apparatus, and a storage medium for storing a program to perform the controlling method.

2. Description of the Related Art

In recent years, a full-color multifunctional machine has been in widespread use according to its price reduction and high functionality. According to such a circumstance, a demand for achieving both low running costs and color printing has increased gradually. For this reason, a printing function which enables printing using two colors of, e.g., black and red has been in widespread use. Incidentally, in the following description, black, white, red, green, blue, cyan, magenta and yellow will be simply indicated respectively by symbols Bk, W, R, G, B, C, M and Y as a matter of convenience.

With respect to the printing using the two colors, there is a technique of automatically determining by which color the printing should be performed, based on color information and a color range included in a full-color designation command. For example, in Japanese Patent Application Laid-Open No. 2002-240361, in a case where two colors of black and red are used, it is possible to perform color printing to a certain area and perform monochrome printing to another area.

However, in Japanese Patent Application Laid-Open No. 2002-240361, since it is automatically determined for each area whether to perform the color printing or the monochrome printing, following problems are caused. That is, despite a user's intention, color printing may not be performed to the area to which a user wishes to perform the color printing. On the contrary, despite a user's intention, color printing may be performed to the area to which a user wishes to perform the monochrome printing.

The present invention has been completed in order to solve the above-described problem, and an object thereof is to display a plurality of various preview images in a case where color printing is performed to a specific area of image data and monochrome printing is performed to another area.

SUMMARY OF THE INVENTION

To achieve the above object, in the present invention, there is provided an image processing apparatus which is characterized by comprising: an inputting unit configured to input image data; a determining unit configured to determine, in the image data, an area for which color printing is performed, based on designation of a user; a generating unit configured to generate the image data of a plurality of patterns in case of the color printing performed to the area determined by the determining unit; and a displaying unit configured to display the image data of the plurality of patterns.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings.

Description of System Configuration

First Embodiment

Figure 1:
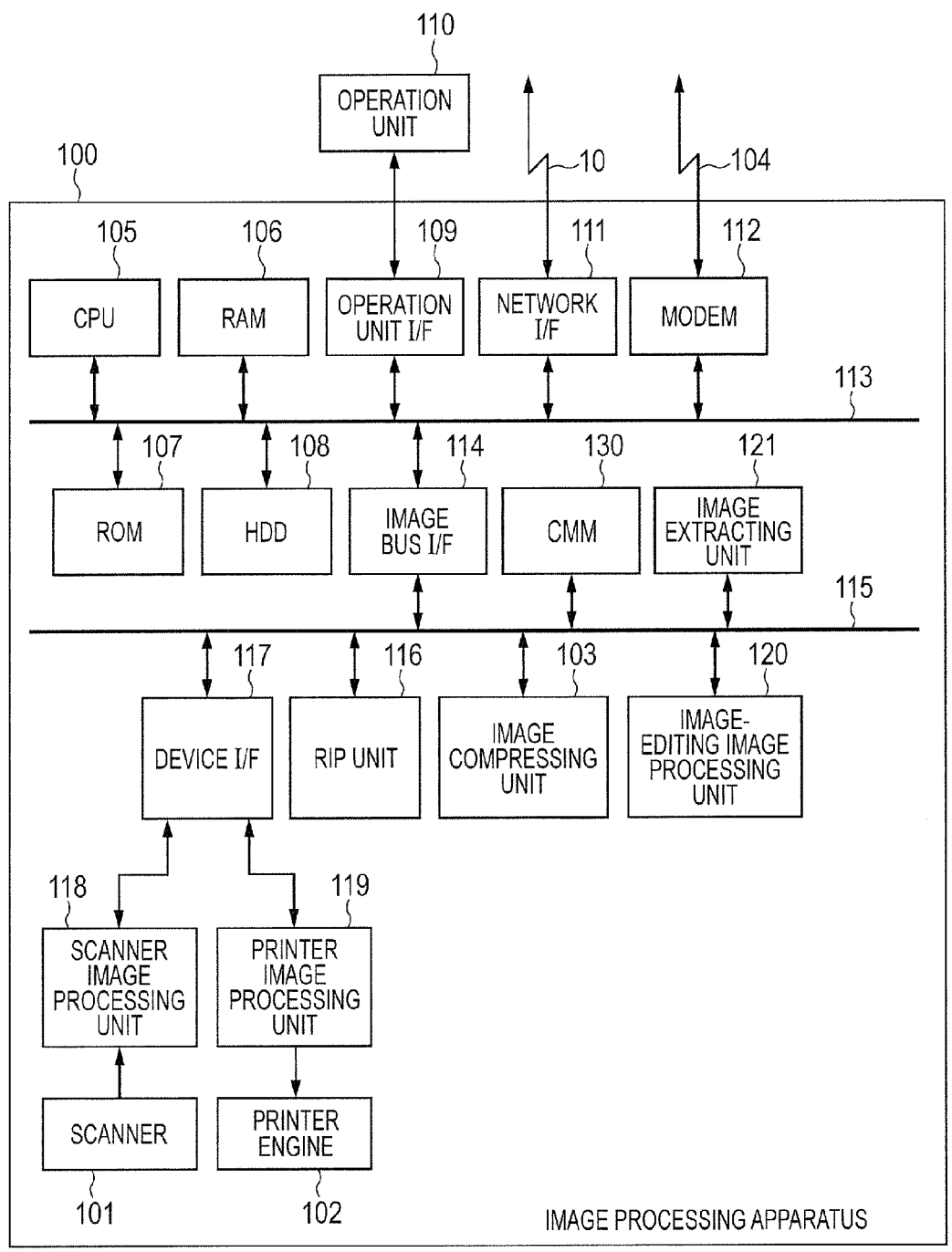
FIG. 1 is a block diagram illustrating an example of an image processing apparatus according to an embodiment of the present invention.

FIG. 1 is a block diagram illustrating an example of an image processing apparatus according to the first embodiment of the present invention.

In FIG. 1, an image processing apparatus 100 is equipped with a scanner 101 which serves as an image input device. Here, the scanner 101 performs a reading process of reading an image of a color original in a case where a two-color print mode is selected. Further, the image processing apparatus 100 is equipped with a printer engine 102 which serves as an image output device of outputting print data obtained by processing image data received from an external device through a network I/F (interface) 111 with a printer image processing unit 119. Thus, it is controlled to read, print and output the image data. Furthermore, the image processing apparatus 100 is connected to a LAN (local area network) 10 through the network I/F 111 and to a public line 104 through a modem 112, thereby controlling inputting and outputting of image information and device information through the LAN 10 and the public line.

A CPU (central processing unit) 105 totally controls an image inputting process, an image transmitting process and an image outputting process by loading control programs stored in a ROM (read only memory) 107 and an HDD (hard disk memory) 108 to a RAM (random access memory) 106 and then executing the loaded programs. Here, the RAM 106 is a system working memory which is used for the CPU 105 to operate, and is also an image memory which temporarily stores the input image data. The ROM 107 is a boot ROM which stores system boot programs. Further, the HDD 108 stores system software for various processes, the input image data, and the like.

An operation unit I/F 109 interfaces with an operation unit 110 which has a display screen capable of displaying the image data and the like, and outputs operation screen data to the operation unit 110. Further, the operation unit I/F 109 transfers information input by a user from the operation unit 110 to the CPU 105.

Incidentally, the operation unit 110 includes a displaying section on which color images and software buttons are displayed, various hardware keys, a touch panel, and the like. In case of previewing a later-described image on the displaying section, printable output variations which have been image-processed are displayed according to set process modes. More specifically, in the two-color print mode, an image process is performed to an image area of each attribute extracted by analyzing the image data of the read original, so that the image area of the attribute selected by the user is printed as a more remarkable image area than other image areas, and its variation is displayed.

Here, the software button includes a two-color print mode button based on the two-color print mode described hereinafter. Namely, it should be noted that the two-color print mode is a mode of printing an image by using, among developers provided in the printer engine 102, the developer of two reproducible colors. Further, it should be noted that the two colors to be used may be selected from a plurality of reproducible colors by a user or may previously be set according to the constitution of the printer engine 102.

The network I/F 111, which is achieved by, e.g., a LAN card or the like, is connected to the LAN 10 to input/output information from/to external devices. Further, the modem 112 is connected to the public line 104 to input/output information from/to external devices. The above units are arranged on a system bus 113.

An image bus I/F 114 is an interface which is used to connect the system bus 113 to an image bus 115 for transferring image data at high speed. Also, the image bus I/F 114 serves as a bus bridge for converting a data structure. In any case, a RIP (raster image processor) unit 116, a device I/F 117, an image-editing image processing unit 120, an image compressing unit 103, an image extracting unit 121, and a CMM (color management module) 130 which will be all described in detail hereinafter are connected on the image bus 115.

The RIP unit 116 performs a process for extracting a PDL (page description language) code received from an information processing apparatus through the LAN 10 into image data. The device I/F 117 is connected to the scanner 101 through a scanner image processing unit 118 and to the printer engine 102 through the printer image processing unit 119, and performs synchronous/asynchronous conversion to the image data.

Further, the scanner image processing unit 118 performs various processes such as correction, editing, image area separation and the like to the image data input from the scanner 101. Besides, the image-editing image processing unit 120 performs various image processes such as rotation, magnification change, two-coloring, binary conversion and the like to the image data.

When the image data processed by the RIP unit 116, the scanner image processing unit 118 and the image-editing image processing unit 120 are once stored in the HDD 108, the image compression unit 103 performs encoding to the image data according a predetermined compression method.

The image extracting unit 121 decodes and extracts the compressed and encoded data. More specifically, the image extracting unit 121 decodes and extracts, as necessary, the image data which was once compressed and encoded in the process of the image-editing image processing unit 120 and stored in the HDD 108. Further, when the image data is processed by the printer image processing unit 119 and output by the printer engine 102, the image extracting unit 121 decodes and extracts the once compressed and encoded data. The printer image processing unit 119 performs the image process, the correcting process and the like to the image data to be print output, according to the printer engine 102.

The CMM 130 is a dedicated hardware module which performs a color converting process (also called a color space converting process) to the image data, based on a profile and calibration data. Here, the profile is information such as a function for converting color image data represented in a device-dependent color space into color image data in a device-independent color space (e.g., a Lab color space). Further, the calibration data is data which is used to correct a color reproduction characteristic of the scanner 101 or the printer engine 102.

Figure 2:
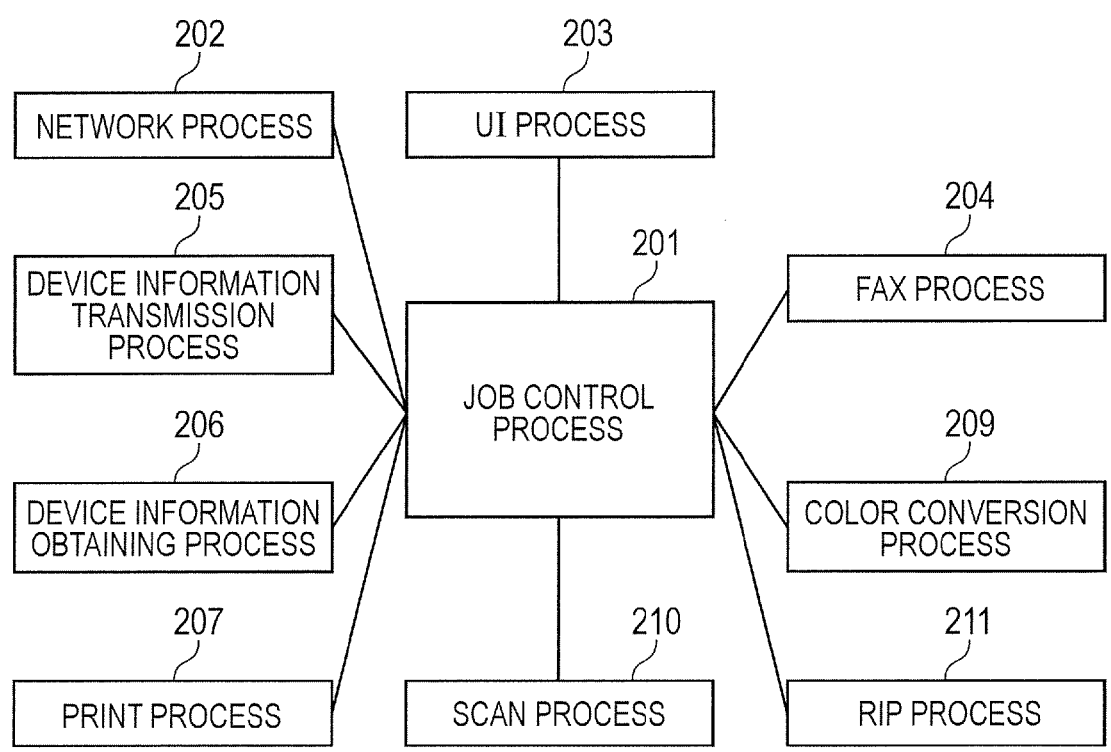
FIG. 2 is a block diagram for describing a configuration of software modules to be applied to the image processing apparatus.

FIG. 2 is a block diagram for describing a configuration of software modules to be applied to the image processing apparatus illustrated in FIG. 1. Incidentally, when mainly the CPU 105 is operated on the RAM 106, the data process corresponding to each of the later-described modules is performed.

In FIG. 2, a job control process 201 is the module for totally controlling each of illustrated/not-illustrated software modules, and controlling all of not-illustrated jobs such as copying, printing, scanning, FAX transmitting/receiving and the like occurred in the image processing apparatus 100.

A network process 202 is the module for controlling communication which is performed with an external device mainly through the network I/F 111, thereby controlling the communication with each device on the LAN 10. Further, when a control command and data are received from the devices on the LAN 10, the network process 202 notifies the job control process 201 of the received contents. Further, the network process 202 transmits a control command and data to each device on the LAN, on the basis of an instruction from the job control process 201.

A UI process 203 is the module for mainly controlling the operation unit 110 and the operation unit I/F 109. More specifically, the UI process 203 notifies the job control process 201 of operation contents by an operator on the operation unit 110, and also controls the display contents on the display screen of the operation unit 110 based on an instruction from the job control process 201.

A FAX process 204 is the module for controlling a FAX function. That is, the FAX process 204 performs FAX transmission/reception through the modem 112, performs an appropriate image process to a FAX received image, and then notifies the job control process 201 of the received FAX image. The FAX process 204 performs the FAX transmission of the image designated by the job control process 201 to a designated notification. Further, a device information transmission process 205 is the module for controlling other data transmission, and a device information obtaining process 206 is the module for controlling other data reception and data obtaining.

A print process 207 is the module for controlling the image-editing image processing unit 120, the printer image processing unit 119 and the printer engine 102 based on an instruction of the job control process 201, thereby performing the print process to the designated image. The print process 207 accepts image data, image information (a size of the image data, a color mode, resolution, etc.), layout information (offset, enlargement/reduction, frame adding, etc.), and output paper information (a size, a printing direction, etc.), from the job control process 201.

Further, the print process 207 controls the image compressing unit 103, the image extracting unit 121, the image-editing image processing unit 120 and the printer image processing unit 119 to perform the appropriate image process to the image data, and also controls the printer engine 102 to perform the printing to the designated paper.

A scan process 210 is the module for controlling the scanner 101 and the scanner image processing unit 118 to perform reading to an original put on the scanner 101, based on an instruction of the job control process 201.

A color conversion process 209 is the module for performing a color conversion process to the designated image based on an instruction of the job control process 201, and notifying the job control process 201 of the image obtained after the color conversion process.

An RIP process 211 is the module for interpreting the PDL, performing rendering by controlling the RIP unit 116, and then extracting or decompressing the image data into bitmap image data, on the basis of an instruction of the job control process 201. Incidentally, the RIP process may be performed by dedicated hardware.

In the image processing apparatus constituted as above, it is assumed that, in a two-color copy mode using, e.g., red and black, an object that a user wishes to reproduce with two colors is selected on the operation unit 110, and preview images of a plurality of image process patterns are generated and displayed based on the user's selection. Such an operation will be described. Further, controlling to be performed subsequent to the above process will be described in detail with reference to a flow chart illustrated in FIG. 3. In the controlling, the user selects an intended image from the preview images, and the two-color copy operation is performed based on the user's selection.

Figure 3:
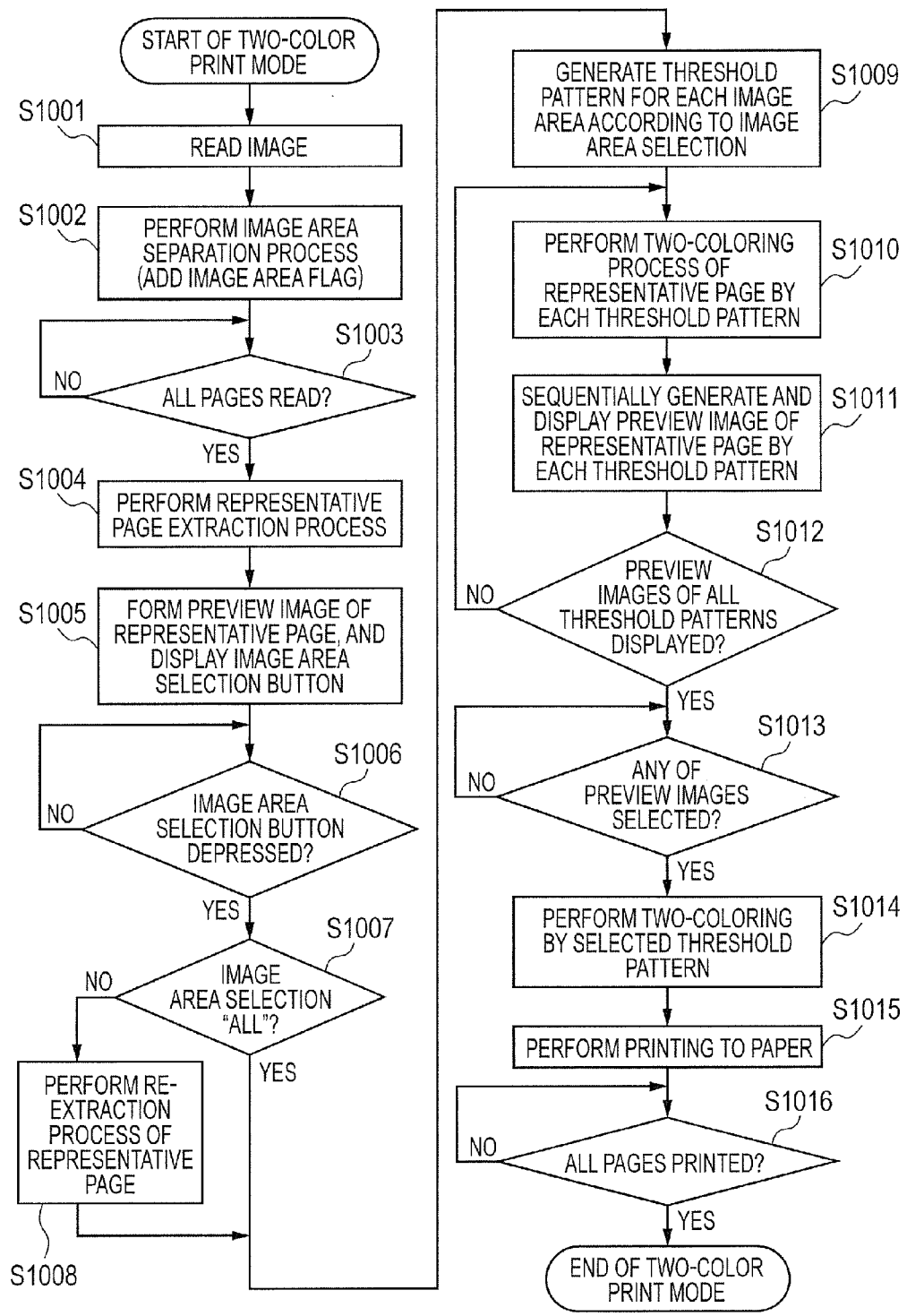
FIG. 3 is a flow chart for describing a controlling method of the image processing apparatus.

FIG. 3 is the flow chart for describing a controlling method of the image processing apparatus according to the present embodiment. Incidentally, it should be noted that respective steps in the flow chart are achieved on the premise that the CPU 105 loads and executes the respective modules illustrated in FIG. 2 stored in the ROM 107 or the HDD 108. Hereinafter, the image process which is performed, when the two-color print mode is set, to perform the image area separation process to the image data and extract the page used as the representative page from the attribute-based classified area. More specifically, in the image data of the extracted page, different color processes are performed respectively to the image area of the image data corresponding to the selected attribute and the image area of the image data corresponding to the not-selected attribute, and the image data of the representative page subjected to a two-coloring process is reduced and previewed on the display section.

Initially, the color original is set to the scanner 101 by the user, and a not-illustrated two-color copy mode button is selected on the operation unit 110 by the user. Then, when a not-illustrated copy start button is depressed, the originals are sequentially read by the scanner 101 (S1001). Here, the read originals are sequentially input to the scanner image processing unit 118.

Figure 4:
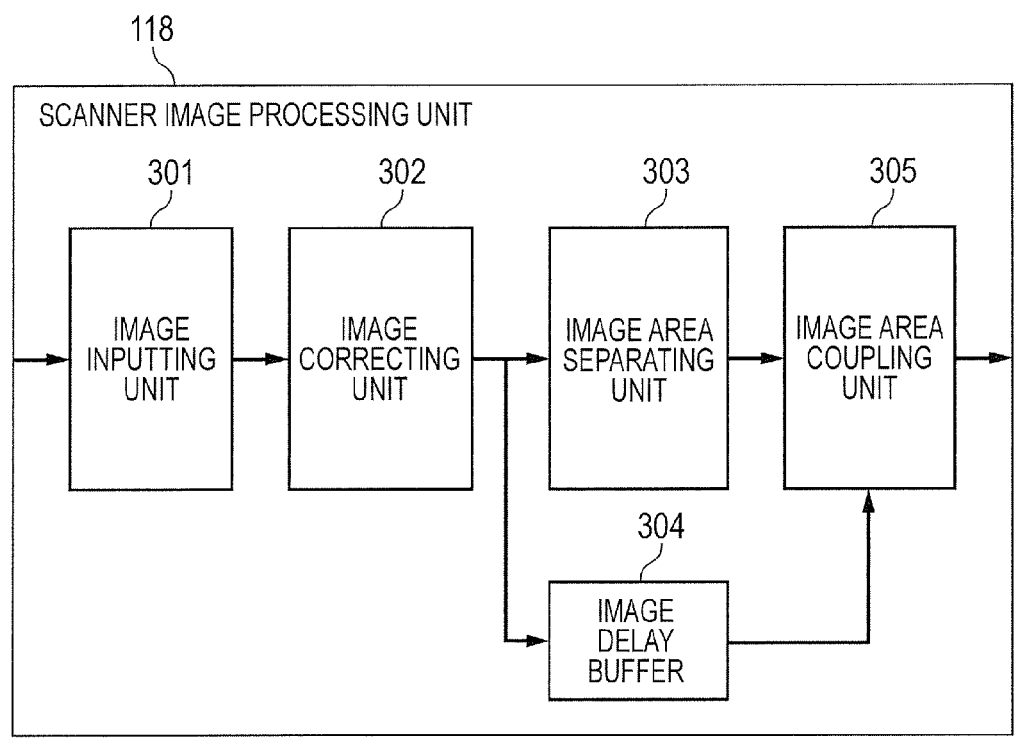
FIG. 4 is a block diagram for describing a constitution of the scanner image processing unit illustrated in FIG. 1.

FIG. 4 is a block diagram for describing a constitution of the scanner image processing unit 118 illustrated in FIG. 1.

In FIG. 4, the image data input to the scanner image processing unit 118 is transferred to an image correcting unit 302 through an image inputting unit 301. In the image correcting unit 302, image correction concerning the scanner 101 is performed to the input image data. Then, the image data image-corrected by the image correcting unit 302 is transferred to an image area separating unit 303, and an image area separation process is performed to the input image data. More specifically, in the image area separating unit 303, the image data is divided into the areas. Among them, the areas respectively having similar attributes are grouped, and the attributes of the thus divided and grouped areas are judged. Here, since the image area separation process itself is used by a known technique, the detail thereof will be omitted. In the present embodiment, a "character" area, a "figure" area, a "photograph" area and the like are separated from the image data in the image area separation process.

Incidentally, image area information indicating the image area separation result is output from the image area separating unit 303 to the pixel in each image area as an image area flag indicating the image area judgment result.

On the other hand, an image delay buffer 304 delays the image data output from the image correcting unit 302 while the image area flag indicating the image area judgment result is being output from the image area separating unit 303.

Back to the description of FIG. 3, the image area flag output from the image area separating unit 303 and the image data output from the image delay buffer 304 are coupled by an image area coupling unit 305. In this operation, the corresponding image area flag is added to each pixel (S1002). Thus, the image area flag for discriminating the area subjected to the image area separation is added to the read image data.

Figure 5:
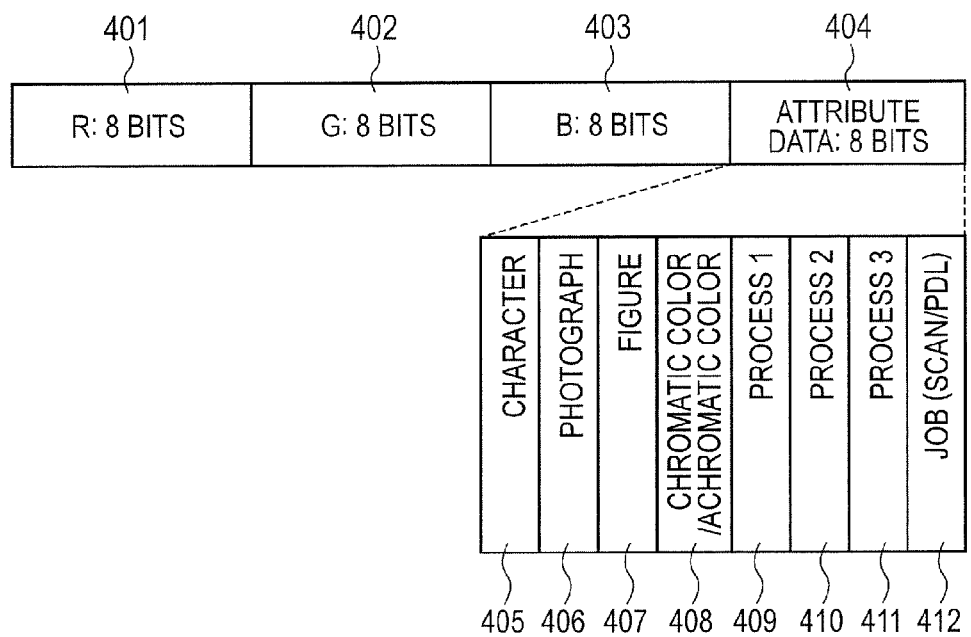
FIG. 5 is a diagram illustrating a pixel format of one pixel to be processed by the scanner image processing unit.

FIG. 5 is a diagram illustrating a pixel format of one pixel to be processed by the scanner image processing unit 119 illustrated in FIG. 1.

In FIG. 5, the input image data includes eight-bit brightness R, G and B image data 401, 402 and 403, and eight-bit attribute data 404, and image area flags indicating respective image areas are provided in a part of the image data. As illustrated in FIG. 5, in the present embodiment, flags 405, 406 and 407 respectively indicating the attributes "character", "photograph" and "figure" are allocated respectively to the 0-th bit, the first bit and the second bit of the attribute data.

Further, a chromatic color/achromatic color flag 408 indicating whether the target pixel is a chromatic color or an achromatic color is allocated to the third bit of the attribute data. Further, process flags 1 409, 2 410 and 3 411 respectively indicating that predetermined processes have been performed to the target pixel, and a flag 412 indicating whether the captured pixel corresponds to a scan job through the scanner 101 or a PDL job through the LAN 10 are allocated to the remaining bits of the attribute data.

The image data to which the image area separation was performed by the scanner image processing unit 118 and the image area flags 405, 406 and 407 have been added is transferred to the image-editing image processing unit 120 through the image bus 115 or the like. Then, the kinds and the number of the image areas of each page in the image data are formed as page image area data.

Figure 6:
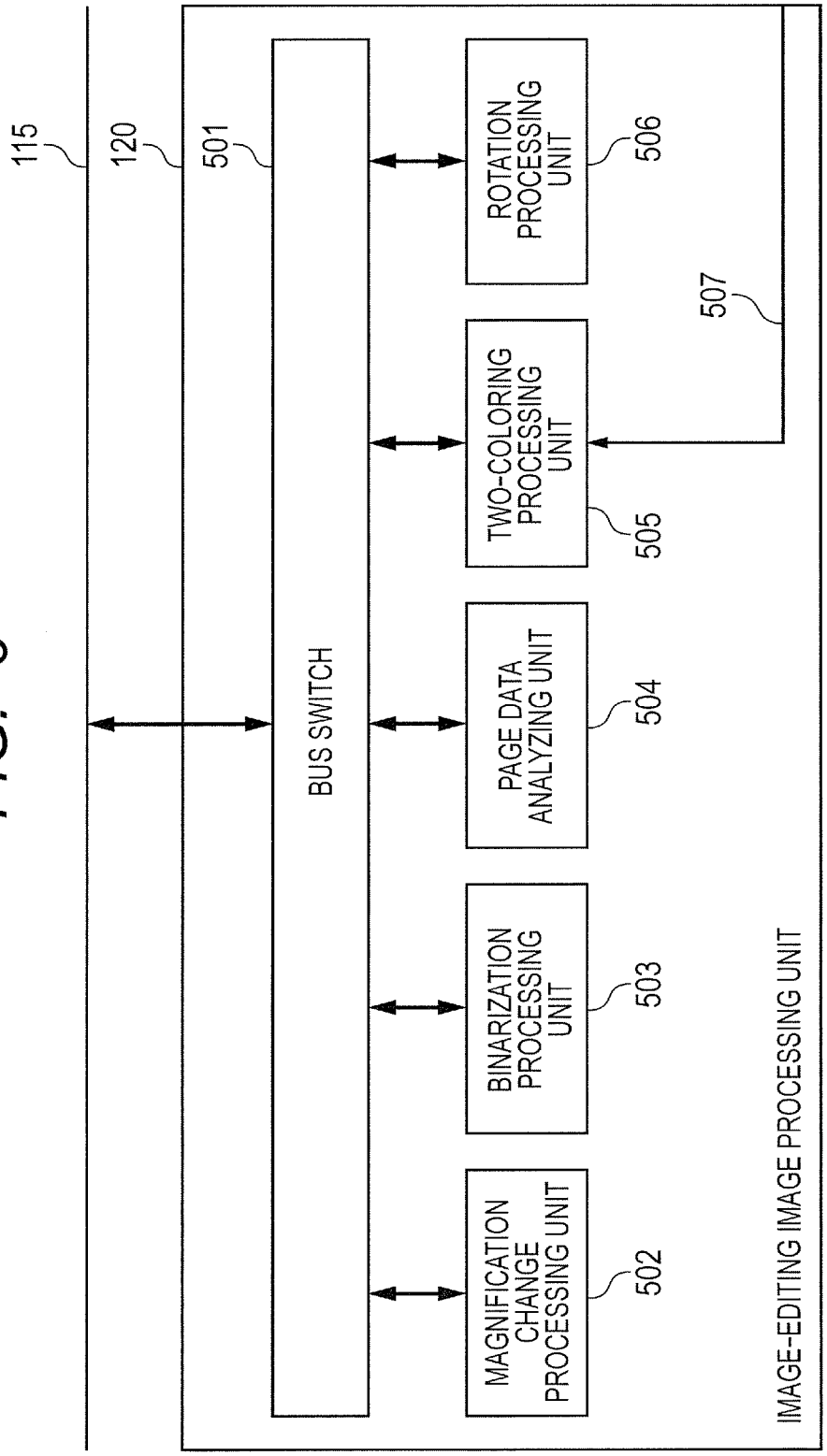
FIG. 6 is a block diagram for describing a constitution of an image-editing image processing unit.

FIG. 6 is a block diagram for describing a constitution of the image-editing image processing unit 120 illustrated in FIG. 6.

In FIG. 6, a magnification change processing unit 502, a binarization processing unit 503, a page data analyzing unit 504, a two-coloring processing unit 505 and a rotating processing unit 506 are mutually connected to others through a bus switch 501 connected to the image bus 115.

The magnification change processing unit 502 performs a magnification change process to the image data, and the rotating processing unit 506 performs a rotation process to the image data. Further, the binarization processing unit 503 performs a conversion process to convert multivalued data into binary data in response to an image area selection signal 507 input from the CPU 105. With respect to the image data to which the image area flags have been added by the scanner image processing unit 118, the page data analyzing unit 504 counts the kinds and number of the image areas included in each page, the number of the pixels allocated to each image area, and the number of the achromatic colors for each image area, as the page image area data. Subsequently, when the forming of the page image area data corresponding to one page ends, the page data analyzing unit 504 causes a not-illustrated internal DMA (direct memory access) controller to store the page image area data to the RAM 106 through the system bus 113 and the like.

Figure 7:
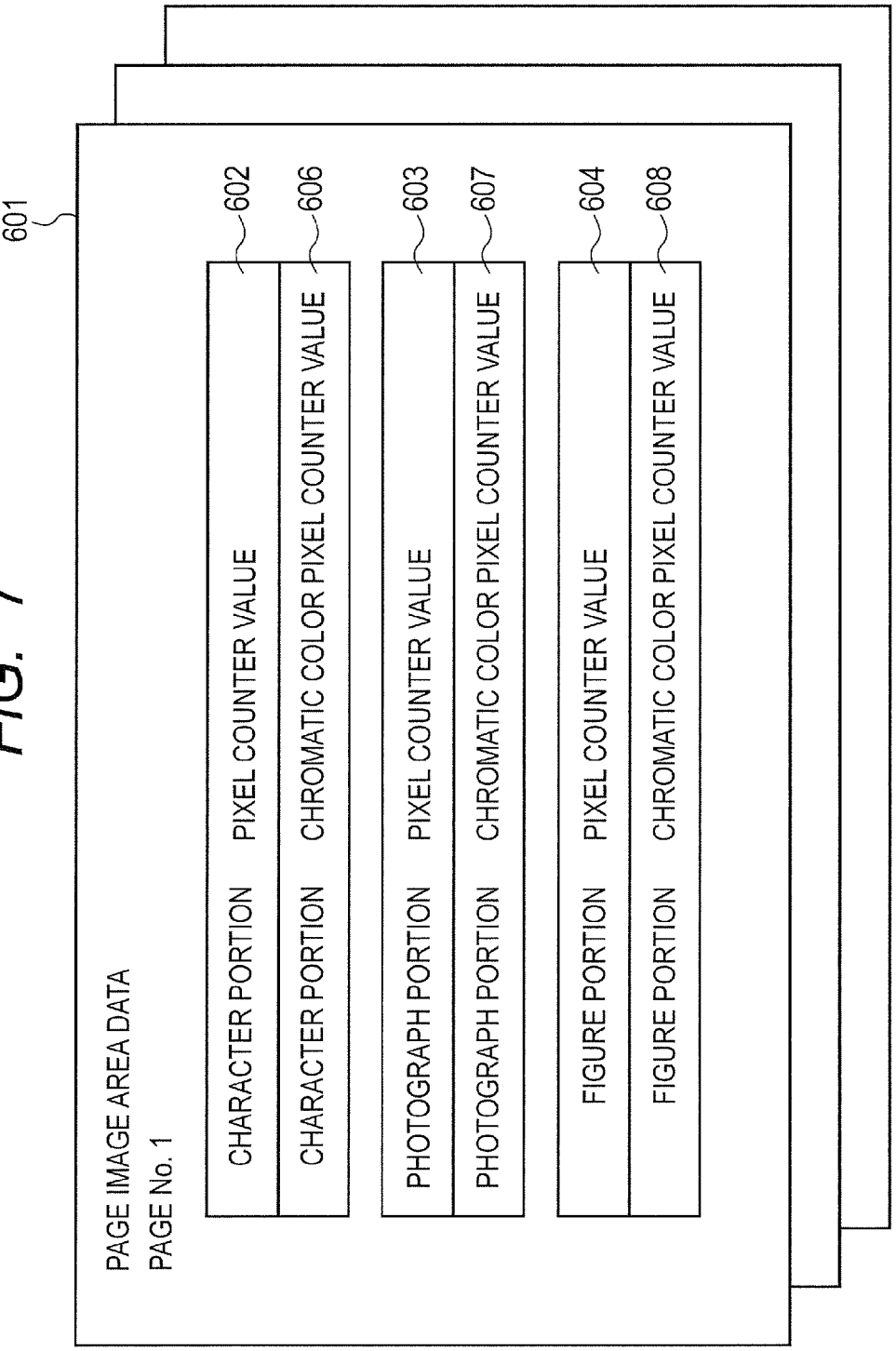
FIG. 7 is a diagram illustrating an example of page image area data generated by a page data analyzing unit.

FIG. 7 is a diagram illustrating an example of page image area data 601 generated by the page data analyzing unit 504 illustrated in FIG. 6.

As illustrated in FIG. 7, the page image area data includes pixel counter values 602, 603 and 604 respectively indicating the number of pixels in the character, photograph and figure portions for each page. Further, in addition to the values of the pixel numbers of the respective areas, the page image area data includes values 606, 607 and 608 respectively indicating the numbers of flags of the chromatic colors in the respective areas.

As just described, all the originals are read by the scanner 101, the image area separation is performed to the image data by the scanner image processing unit 118, and the image area flag is added to each pixel as the part of the attribute flag. Further, the page image area data 601 of all the read pages is formed by the page data analyzing unit 504 in the image-editing image processing unit 120, and the formed data is stored in the RAM 106. The image data is temporarily stored in the RAM 106 through the image bus 115, the image bus I/F 114 and the system bus 113, and then sequentially stored in the HDD 108. Then, when the image data of all the pages are captured and stored, the original reading operation ends (S1003).

Subsequently, the image-editing image processing unit 120 extracts (specifies) the representative page on the basis of the page image area data 601 of each page stored in the RAM 106 through the original reading operation. Further, the image-editing image processing unit 120 forms the preview image from the image data indicating the representative page selected from the pages stored in the HDD 108, and displays the formed preview image on the operation unit 110. Here, this operation will be described.

Initially, from the page image area data 601 of each page stored in the RAM 106, the CPU 105 extracts, as the representative page, the page in which the respective image areas have been divided most equally as the first preview images and the chromatic color exists in all the image areas. The CPU 105 searches for the page which most conforms to the above condition on the basis of the page image area data 601 on the RAM 106. For example, the numbers of the pixels of the character portion 602, the photograph portion 603 and the figure portion 604 in the above page image area data 601 are compared with others, and the page in which the difference among the numbers of the pixels is minimum is selected as the data indicating that the respective image areas have been divided most equally. Further, it is possible, by considering the numbers of the values 606, 607 and 608 respectively indicating the chromatic colors of the image areas, for the CPU 105 to judge that the chromatic color exists in each image area.

By the above operations, the CPU 105 ends the process of extracting the representative page (S1004). Next, the CPU 105 obtains the image data of the representative page from the HDD 108, and causes the magnification change processing unit 502 of the image-editing image processing unit 120 to reduce the size of the image data for the purpose of previewing. Then, the image data size-reduced by the magnification change processing unit 502 is input to the operation unit 110, and the input image data is displayed as the preview image on the display section of the operation unit 110 (S1005).

Figure 8:
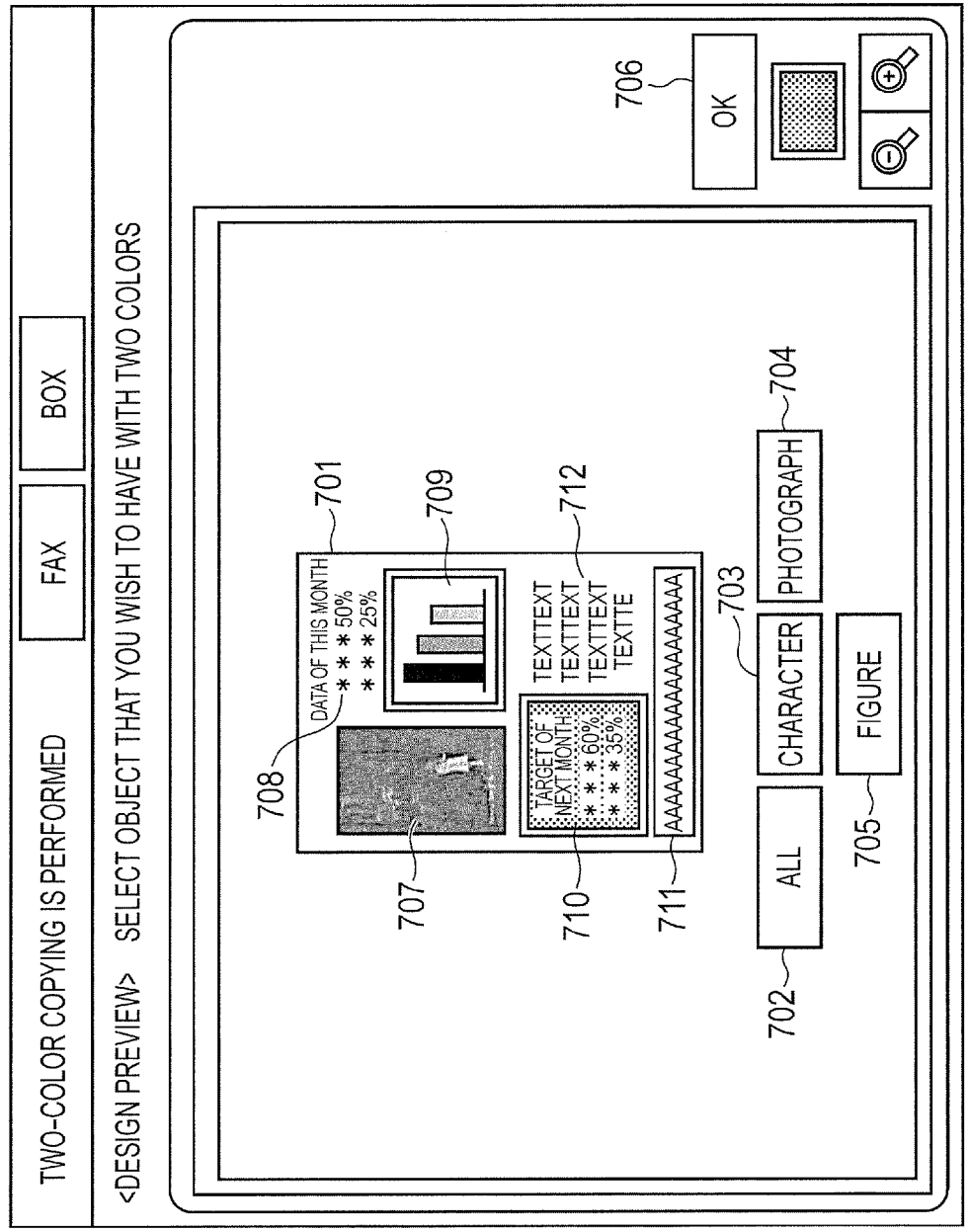
FIG. 8 is a diagram illustrating an example of the UI (user interface) screen to be displayed on the display section of the operation unit illustrated in FIG. 1.
Figure 9:
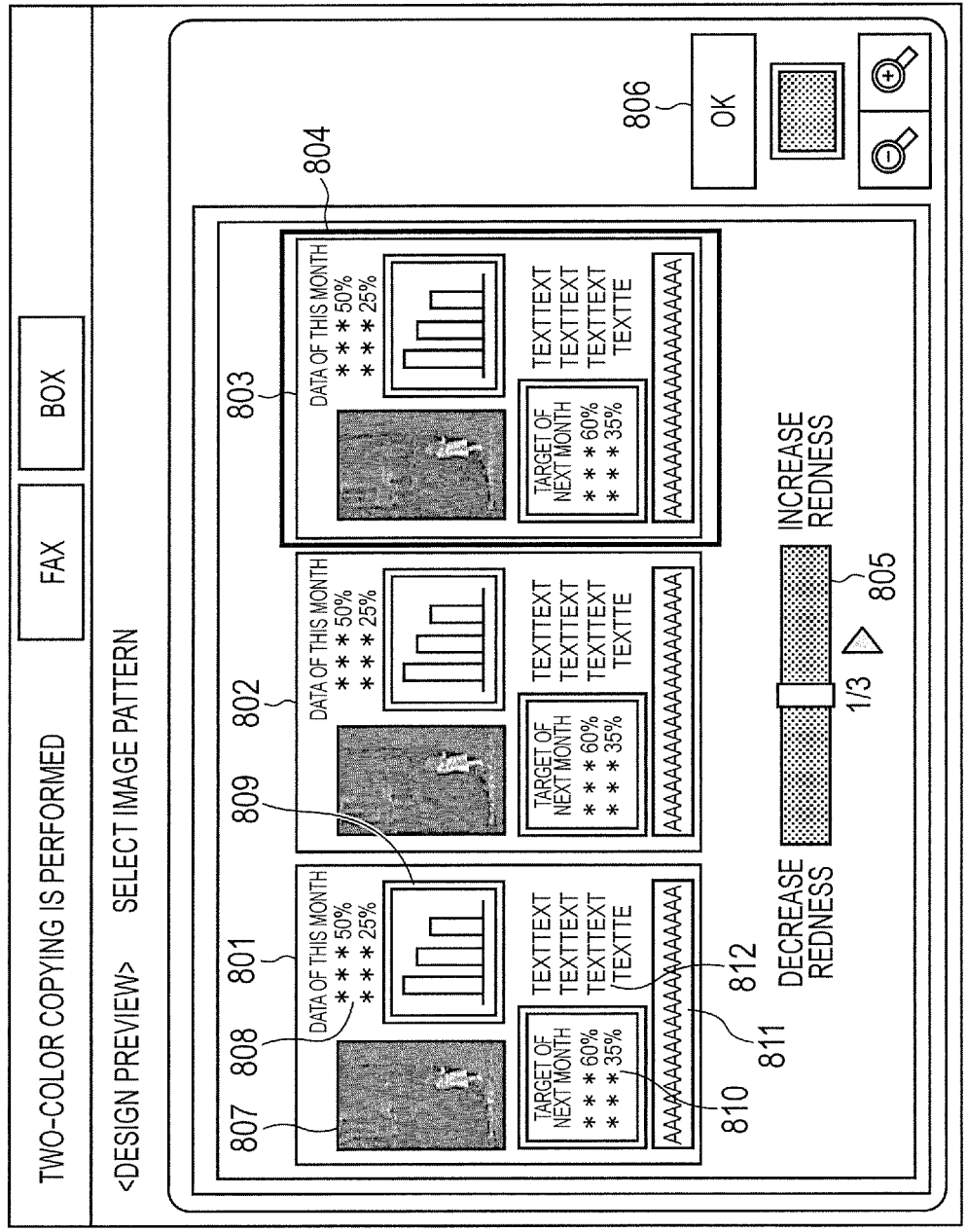
FIG. 9 is a diagram illustrating an example of the UI screen to be displayed on the display section of the operation unit illustrated in FIG. 1.

FIGS. 8 and 9 are diagrams respectively illustrating examples of the UI (user interface) screen to be displayed on the display section of the operation unit 110 illustrated in FIG. 1. Here, the UI screen illustrated in FIG. 8 is the example of the first preview screen displayed when the two-color copying is performed. Hereinafter, a process of selecting the attribute to be emphasized in the two-color print mode to the image data of the color original in the case where the two-color print mode is set will be described. In the present embodiment, it is assumed that the user can select the photograph, the character and the figure as the extractable attributes.

As illustrated in FIG. 8, in the present embodiment, a preview image 701 of the representative page is displayed on the display section. As illustrated, for example, the preview image 701 includes a photograph portion 707, character portions 708, 711 and 712, a halftone dot character portion 710, and a figure portion 709. Further, object selection buttons 702, 703, 704 and 705 for selecting the objects that the user wishes to have with the two colors are arranged at the bottom of the preview image. Thus, the user can select, with the attribute, the image area intended to be emphasized in the two-color print mode, by properly depressing the object that the user wishes to have with the two colors by using the object selection buttons (buttons) 702 to 705. In this case, the object selection button 702 is provided as the button for selecting all the objects. Likewise, the button 703 is provided for selecting the character as the attribute of the object that the user wishes to have with two colors, the button 704 is provided for selecting the photograph as the attribute of the object that the user wishes to have with two colors, and the button 705 is provided for selecting the figure as the attribute of the object that the user wishes to have with two colors.

Therefore, for example, when selecting the button 702 corresponding to "all", the user can perform the two-color copying for all the objects. Likewise, when selecting the button 703 corresponding to "character", the user can perform the two-color copying only for the image area portion of the character. Further, when selecting the plurality of buttons corresponding to "character" and "photograph", the user can perform the two-color copying for the image area portions of the character and the photograph.

After selecting the objects using the object selection buttons 702 to 705, when depressing an OK button 706 displayed on the display section, the user can end the object selection (S1006).

Next, based on the selected objects, it is judged by the CPU 105 whether or not "all" is selected in the object selection (S1007). Then, when it is judged by the CPU 105 that "all" is selected in the object selection, the process is moved to S1009 on the basis of the page extracted earlier as the representative page. On the other hand, when it is judged that "all" is not selected, the process is moved to S1008 to perform a re-extraction process of the representative page.

In S1008, the CPU 105 extracts the page in which the values of the character portion 602 and the chromatic color value 606 are maximum, and the process is moved to S1009. For example, when the selected object is "character", the page in which the values of the character portion 602 and the chromatic color value 606 are maximum is re-extracted as the representative page from the page image area data 601 stored on the RAM 106. That is, the page in which the pixel of the character image area is largest and the number of the pixels of the chromatic color in the character image area is largest is re-extracted as the representative page.

Next, after the representative page was determined in the object selection, the CPU 105 generates a plurality of parameters for the two-coloring process, and previews a plurality of process results after the two-coloring process to the representative page, on the basis of the object selection. Hereinafter, this operation will be described. That is, the case where the object selection button 703 corresponding to "character" is depressed by the user through the operation unit 110 will be described hereinafter.

As described above, when the selected object is "character", the representative page based on the object "character" is re-extracted, and the two-coloring process is performed to the re-extracted page.

First, to perform the two-coloring process to the image area of "character", the CPU 105 transmits a signal indicating "character" as the image area selection signal 507 to the two-coloring processing unit 505. Next, the CPU 105 sets a saturation threshold of a predetermined first two-coloring process to the two-coloring processing unit 505. In the present embodiment, it is assumed that, in the two-coloring process by the two-coloring processing unit 505, saturation (0% to 100%) is used and this saturation is compared with a predetermined saturation threshold (0% to 100%) to judge whether or not to perform the two-coloring process. The CPU 105 sets the saturation threshold to, e.g., 50%, 45%, 40%, . . . and performs the two-coloring process to the representative page, whereby it is possible to generate the image having the two-coloring pattern using the saturation as a parameter to the representative page (S1009).

Next, the CPU 105 calls up and obtains the image data corresponding to the representative page from the HDD 108, transfers the obtained image data to the two-coloring processing unit 505 in the image-editing image processing unit 120, and causes the two-coloring processing unit 505 to perform the two-coloring process with the first saturation threshold (S1010). Here, the size of the image data subjected to the two-coloring process is reduced by the magnification change processing unit 502 for the purpose of previewing. Then, the obtained preview image is displayed on the display section of the operation unit 110 (S1011).

Incidentally, in the two-coloring processing unit 505, since the image area selection signal 507 earlier transmitted by the CPU 105 indicates "character", the pixels having the image area flags other than "character" are subjected to the color conversion into monochrome to have the same density. Likewise, in the two-coloring processing unit 505, the pixels having the image area flag of "character" are subjected to the color conversion into red or monochrome having the same density, on the basis of the saturation threshold.

Thus, the CPU 105 sequentially sets the different saturation thresholds to the image-editing image processing unit 120, performs the two-coloring process to the image data of the representative page in the same manner, and sequentially displays the preview images on the operation unit 110.

At the time when the preview images were generated and displayed with all the saturation thresholds previously prepared, a designation frame 804 is displayed on the UI screen of the display section of the operation unit 110 as illustrated in FIG. 9, and the CPU waits for selection in the plurality of displayed preview images (S1012).

FIG. 9 illustrates the example of the plurality of preview images displayed after the object selection button 703 of "character" in FIG. 8 was earlier selected. In FIG. 9, a saturation adjusting bar 805 for setting the level of saturation to be emphasized in the two-coloring print mode to the previewed representative page is provided. Then, the CPU 105 controls the two-coloring processing unit 505 to perform a process of reducing the image of the representative page subjected to the two-coloring process according to the level of the saturation set by the saturation adjusting bar 805 and re-previewing the reduced image on the display section.

As illustrated in FIG. 9, preview images 801, 802 and 803 are displayed on the display section of the operation unit 110. For example, since "character" has been earlier selected, a photograph portion 807 and a figure portion 809 in each of the preview images 801, 802 and 803 have been subjected to the monochrome process. Further, in the preview image 801, the character portion has been subjected to the two-coloring process with the saturation threshold of 50%, and character portions 808, 811 and 812 and a halftone dot character portion 810 have been color processed into red.

In the preview image 802, the character portion has been subjected to the two-coloring process with the saturation threshold of 45%, and only the portions corresponding to the character portions 808 and 812 have been color processed into red. In the preview image 803, the character portion has been subjected to the two-coloring process with the saturation threshold of 40%, and only the portion corresponding to the character portion 808 has been color processed into red.

When the designation frame 804 is moved and an OK button 806 is depressed by the user, any one of the preview images is designated (S1013). Here, in a case where the saturation adjusting bar 805 is further provided, the designation frame 804 is moved to the image which is intended to be saturation adjusted, and the saturation adjusting is actually performed using the saturation adjusting bar 805 as illustrated in the figure, whereby it is possible to adjust the two-coloring process further in detail from the intended process pattern.

By the above selection and adjustment, with respect to the designated preview image, the CPU 105 again sets, to the two-coloring processing unit 505, the saturation threshold adopted when the relevant preview image was generated, and sequentially performs the two-coloring process of the image data from the first page (S1014).

Then, the image data subjected to the two-coloring process is transferred to the printer image processing unit 119 through the image bus 115 and the device I/F 117, the transferred image data is subjected to the image process for printing, and then the obtained image data are sequentially printed by the printer engine 102 (S1015). Then, when it is judged by the CPU 105 that the two-coloring process and the printing end for all the pages (S1016), the operation in the two-color print mode ends.

In the present embodiment, the two-color copy mode of red and black has been described. However, for example, even in a case where coloring is performed to only one object, it is possible to perform the relevant coloring by replacing the two-coloring processing unit 505 of FIG. 6 with a color processing unit and performing a color process to the pixels in the corresponding image area on the basis of the object selection. Therefore, it is possible to apply the present embodiment to any print mode of performing partial coloring including two colors.

In the present embodiment, in the print mode of printing the partial image with two colors as in the two-color copying, the previewing of the plurality of representative pages after the two-coloring process extracted by using the parameters for the two-coloring process is performed based on the selection of the object that the user wishes to have with two colors.

Thus, the user can select, from the plurality of the preview images, the image process pattern which is closest to the user's intention, and then perform the printing based on the selected pattern.

Second Embodiment

In the above first embodiment, the user selects the object that he/she wishes to have with two colors by the object selection button, changes the parameter of the two-coloring process to the selected object, and displays the plurality of the preview images. In the present embodiment, to achieve a further simplified operation, printing is performed from previewing in the two-color copy mode or the partial color copy mode. Hereinafter, this operation will be described in detail. More specifically, the two-coloring process pattern determined according to the number of attributes to be emphasized in the two-color print mode is stored in regard to the image data of the read color original. Further, the page to be used as the representative page is extracted by performing the image area separation process to the image data according to the two-coloring process pattern selected by the user. Then, the coloring process is performed to the image area corresponding to the attribute determined for each two-coloring process patter in the image data of the extracted page, and the image data of the representative page subjected to the two-coloring process is reduced and previewed on the display section.

Incidentally, in the present embodiment, since the constitution of the image processing apparatus is the same as that described in the first embodiment, the explanation of the hardware illustrated in FIG. 1 will be omitted.

In the present embodiment, likewise, in the two-color copy mode of red and black, the pattern to be subjected to the two-coloring process including changing of the object is automatically determined, and the preview images of the plurality of the image process patterns are generated and displayed. Then, the user selects the intended image from the previewing, and performs the two-color copying operation based on the selection. Such a method of controlling the above operation will be described in detail with reference to a flow chart illustrated in FIG. 10.

Figure 10:
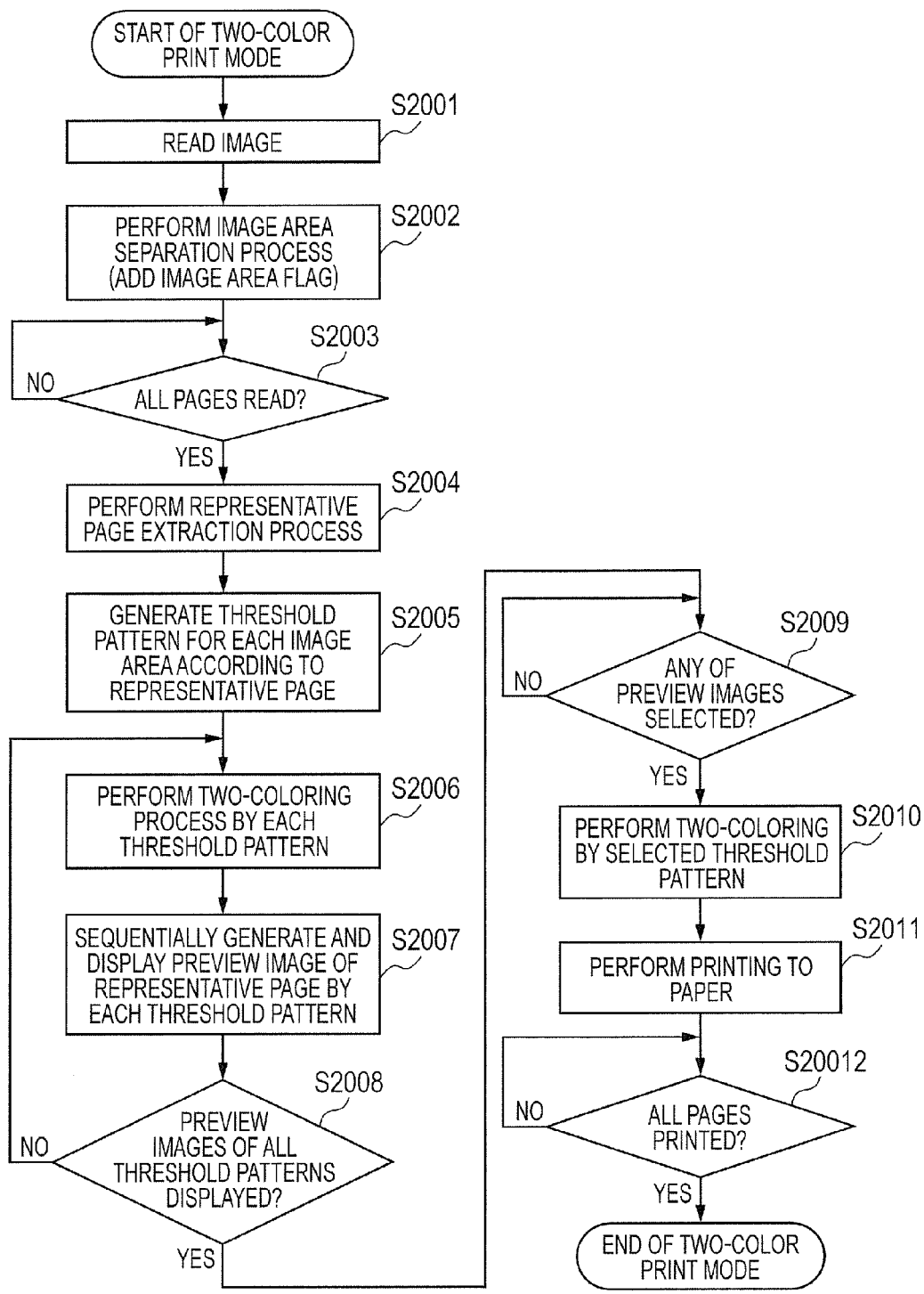
FIG. 10 is a flow chart for describing a controlling method of the image processing apparatus.

FIG. 10 is the flow chart for describing the controlling method of the image processing apparatus according to the present embodiment. Incidentally, it should be noted that respective steps in the flow chart are achieved on the premise that the CPU 105 loads and executes the respective modules illustrated in FIG. 2 stored in the ROM 107 or the HDD 108.

Initially, a color original is set to the scanner 101 by the user, and the not-illustrated two-color copy mode button is selected on the screen of the operation unit 110. Then, when the copy start button is depressed by the user, the set originals are sequentially read by the scanner 101, thereby obtaining the original images (S2001).

As with the first embodiment, the image area separation process is performed to the image data corresponding to the image of the read original by the image area separating unit 303 of the scanner image processing unit 118. Further, the image area flag output from the image area separating unit 303 and the image data output from the image delay buffer 304 are coupled by the image area coupling unit 305, and the corresponding image area flag is added to each pixel (S2002).

With respect to the image data subjected to the image area separation process by the scanner image processing unit 118, the page image area data 601 of each page is likewise formed by the page data analyzing unit 504 in the image-editing image processing unit 120, and the obtained data are sequentially stored in the RAM 106 at the time with the analysis of each page ends.

The image data are temporarily stored in the RAM 106 through the image bus 115 and the like, and then sequentially stored in the HDD 108. Then, when it is judged by the CPU 105 that the image data of all the pages have been captured and stored, the original reading operation ends (S2003).

Next, the representative page extraction process is performed as with the first embodiment. That is, in the page image area data 601 of each page stored in the RAM 106, since the respective image areas have been divided most equally as the first preview images, the page in which the chromatic color exists in all the image areas is extracted as the representative page (S2004).

Next, in the present embodiment, the CPU 105 reads the page image area data for the representative page, and determines the process pattern of the two-coloring process based on the number of the image areas existing in the representative page and existence/non-existence of the chromatic color in each image area.

More specifically, if the image areas of the representative page are only two of "character" and "figure" and both the areas include the chromatic color, the pattern for performing the two-coloring process to both the areas "character" and "figure" is generated as the image area process pattern for the two-coloring process. At the same time, the process pattern for performing the two-coloring process to only the area "character" is generated, and also the process pattern for performing the two-coloring process to only the area "figure" is generated. Namely, the three process patterns are generated.

Further, if the saturation thresholds as described in the first embodiment are set to have the four steps for each process pattern, it is possible to generate the 12 process patterns of 3 patterns×4 steps (S2005).

After the process pattern was generated as described above, the CPU 105 calls up and obtains the image data corresponding to the representative page from the HDD 108, transfers the obtained image data to the two-coloring processing unit 505 in the image-editing image processing unit 120, and causes the two-coloring processing unit 505 to perform the two-coloring process with the first process pattern and the saturation threshold (S2006). Next, the size of the image data subjected to the two-coloring process is reduced by the magnification change processing unit 502 for the purpose of previewing. Then, the obtained preview image is displayed on the operation unit 110 (S2007).

Figure 11:
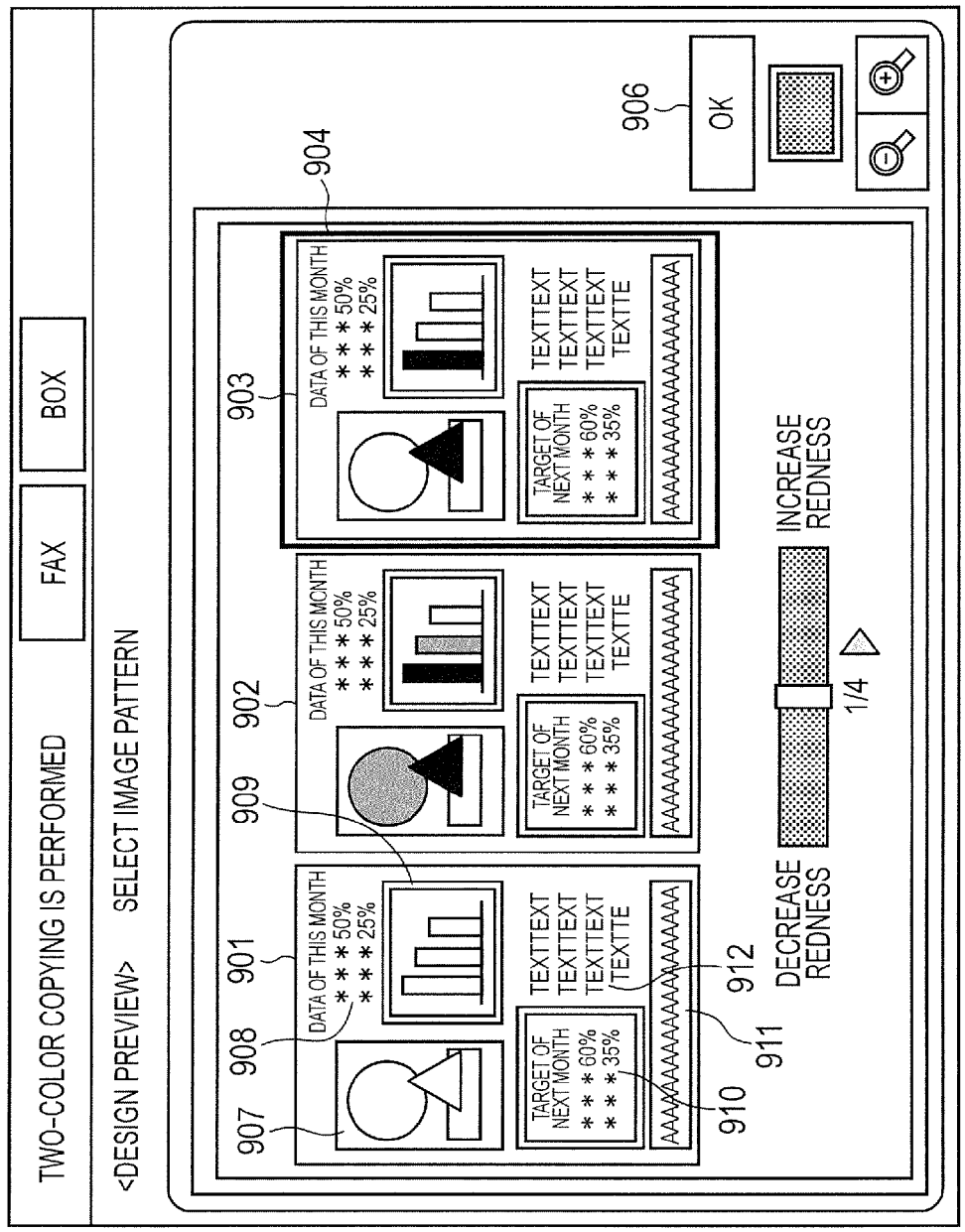
FIG. 11 is a diagram illustrating an example of the UI screen to be displayed on the display section of the operation unit illustrated in FIG. 1.

Thus, the CPU 105 sequentially sets the different process patterns and the saturation thresholds of different steps to the image-editing image processing unit 120, and causes the two-coloring processing unit to perform the two-coloring process to the image data of the representative page. Then, the reduction process for the previewing is performed by the magnification change processing unit 502, and the preview images are sequentially displayed on the display section of the operation unit 110. At the time when all the previously prepared process patterns and the preview images based on the different-step saturation thresholds for the respective process patterns were generated and displayed (i.e., the 12 patterns in the previous case), a designation frame 904 illustrated in FIG. 11 is displayed on the operation unit 110. Then, the CPU waits for selection in the plurality of displayed preview images (S2008).

FIG. 11 illustrates an example of the UI screen to be displayed on the operation unit 110 illustrated in FIG. 1. Here, this example is directed to displaying of the plurality of preview images on the displaying section of the operation unit 110.

In the present embodiment, preview images 901, 902 and 903 which are parts of all the preview images are displayed on the displaying section of the operation unit. More specifically, the plurality of the pages each consisting of only "character" and "figure" are displayed as the representative pages as previously described.

Incidentally, one of the representative pages consists of character portions 908, 911 and 912, a halftone dot character portion 910 and figure portions 907 and 909.

For example, in the preview image 901, all the figure portions have been subjected to the monochrome process, and the character portions have been subjected to the two-coloring process with the saturation threshold of 80%. More specifically, the character portions 908 and 912 have been subjected to the red process to have the red images. In the preview image 902, all the character portions have been subjected to the monochrome process, and the figure portions have been subjected to the two-coloring process with the saturation threshold of 80%. More specifically, the portions corresponding to the figure portions 907 and 909 have been subjected to the red process to have the red images.

In the preview image 903, both the character portions and the figure portions have been subjected to the two-coloring process with the saturation threshold of 60%. More specifically, the portions corresponding to the character portion 908 and the figure portions 907 and 909 have been subjected to the two-coloring process.

When the designation frame 904 is moved and an OK button 906 is depressed by the user, the CPU 105 judges that any one of the preview images has been designated (S2009). Then, the CPU 105 again sets, to the two-coloring processing unit 505, the process pattern of which the designated preview image has been generated and the saturation threshold, and sequentially performs the two-coloring process of the image data from the first page (S2010).

Next, as with the first embodiment, the image data subjected to the two-coloring process is transferred to the printer image processing unit 119 through the image bus 115 and the device I/F 117, the transferred image data is subjected to the image process for printing, and then the obtained image data are sequentially printed by the printer engine 102 (S2011). Then, when it is judged by the CPU 105 that the two-coloring process and the printing have ended for all the pages (S2012), the operation in the two-color print mode ends.

Incidentally, as with the first embodiment, the two-color copy mode of red and black has been described in the present embodiment. However, for example, even in a case where coloring is performed to only one object, it is possible to perform the coloring process to the pixel of the corresponding image area based on the object selection by replacing the two-coloring processing unit 505 of FIG. 6 with a color processing unit. Therefore, it is possible to apply the present embodiment to a print mode if it is the print mode of performing partial coloring including two colors.

Further, in the present embodiment, the plurality of the preview patterns are generated and displayed on the operation unit 110 not based on the image area selection but based on the pattern of the image area and the saturation threshold. However, for example, to cope with a situation that the quantity of a toner to be used for the printing runs low in the image processing apparatus 100, there may be provided a mode capable of contributing to toner saving by recommending the user to select, from a plurality of previews, a pattern by which toner consumption is least.

According to the present embodiment, in the print mode of printing the image with two colors as in the two-color copying, the representative page on which the two-coloring process pattern can be displayed most is extracted from the original data, and the process pattern of the two-coloring process is generated on the basis of the number of the image areas based on the representative page and existence/non-existence of the chromatic color. Further, the plurality of the representative pages after the two-coloring process corresponding to such a set are previewed.

Thus, as compared with the first embodiment, the user can select, from the plurality of the preview images, the image process pattern which is closest to the user's intention more easily, and then perform the printing based on the selected pattern.

Other Embodiments

Aspects of the present invention can also be realized by a computer of a system or an apparatus (or devices such as a CPU or MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-260780, filed Nov. 29, 2011, which is hereby incorporated by reference herein in its entirety.

What is claimed is:
1. An image processing apparatus comprising:
an inputting unit configured to input image data;
a determining unit configured to determine, in the image data, an area for which color printing is performed, based on designation of a user;
a generating unit configured to generate the image data of a plurality of patterns in case of the color printing performed to the area determined by the determining unit; and
a displaying unit configured to display the image data of the plurality of patterns,
wherein the color printing is the printing using black and another color different from the black,
the generating unit generates the image data in case of the color printing performed when saturation of the area determined by the determining unit is equal to or higher than a predetermined saturation threshold and monochrome printing performed when the saturation of the area determined by the determining unit is less than the predetermined saturation threshold, and
the generating unit generates the image data of the plurality of patterns in which the predetermined saturation threshold has been changed respectively.

2. The image processing apparatus according to claim 1, further comprising a printing unit configured to perform printing of, among the image data of the plurality of patterns displayed by the displaying unit, the image data selected by the user.

3. The image processing apparatus according to claim 1, further comprising a specifying unit configured to specify, in a case where the image data input by the inputting unit is configured by a plurality of pages, a representative page among the plurality of pages,
    wherein the generating unit generates the image data of the plurality of patterns for the representative page.

4. The image processing apparatus according to claim 3, wherein the specifying unit specifies the representative page based on an image area of the image data.

5. The image processing apparatus according to claim 4, wherein the image area of the image data corresponds to a character, a photograph and a figure.

6. A controlling method of an image processing apparatus, comprising:
    inputting image data;
    determining, in the image data, an area for which color printing is performed, based on designation of a user;
    generating the image data of a plurality of patterns in case of the color printing performed to the determined area; and
    displaying the image data of the plurality of patterns,
    wherein the color printing is the printing using black and another color different from the black,
    the image data is generated in case of the color printing performed when saturation of the determined area is equal to or higher than a predetermined saturation threshold and monochrome printing performed when the saturation of the determined area is less than the predetermined saturation threshold, and
    the image data of the plurality of patterns in which the predetermined saturation threshold has been changed respectively is generated.

7. A non-transitory computer-readable storage medium for storing a program to cause a computer to perform the controlling method of the image processing apparatus according to claim 6.

* * * * *